United States Patent
Dow et al.

(10) Patent No.: US 10,228,794 B2
(45) Date of Patent: Mar. 12, 2019

(54) GESTURE RECOGNITION AND CONTROL BASED ON FINGER DIFFERENTIATION

(71) Applicant: International Business Machines Corporation, Armonk, NY (US)

(72) Inventors: Eli M. Dow, Wappingers Falls, NY (US); Thomas D. Fitzsimmons, Poughkeepsie, NY (US); Tynan J. Garrett, Poughkeepsie, NY (US); Emily M. Metruck, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/808,927

(22) Filed: Nov. 10, 2017

(65) Prior Publication Data
US 2018/0074646 A1 Mar. 15, 2018

Related U.S. Application Data

(63) Continuation of application No. 14/950,630, filed on Nov. 24, 2015, now Pat. No. 9,851,806.

(51) Int. Cl.
*G06F 1/16* (2006.01)
*G06F 3/041* (2006.01)
(Continued)

(52) U.S. Cl.
CPC ............ *G06F 3/0416* (2013.01); *G06F 1/163* (2013.01); *G06F 3/017* (2013.01); *G06F 3/02* (2013.01);
(Continued)

(58) Field of Classification Search
None
See application file for complete search history.

(56) References Cited

U.S. PATENT DOCUMENTS

| 2008/0165160 A1 | 7/2008 | Kocienda et al. |
| 2014/0013417 A1 | 1/2014 | Sakai et al. |

(Continued)

FOREIGN PATENT DOCUMENTS

WO WO2014055240 A2 * 4/2014

OTHER PUBLICATIONS

Dow, Eli M., et al. "Gesture Recognition and Control Based on Finger Differentiation" U.S. Appl. No. 15/808,928, filed Nov. 10, 2017.

(Continued)

*Primary Examiner* — Gustavo D Polo
(74) *Attorney, Agent, or Firm* — Cantor Colburn LLP; Teddi Maranzano

(57) ABSTRACT

An embodiment of a computer implemented method of performing a processing action includes detecting an input from a user via an input device of a processing device, the input including a touch by at least one finger of a plurality of fingers of the user, estimating a gesture performed by the at least one finger based on the touch, measuring at least part of a fingerprint of the at least one finger, and identifying the at least one finger used to apply the input by the user based on stored fingerprint data that differentiates between individual fingers of the user. The method also includes identifying an action to be performed based on the estimated gesture and based on the identified at least one finger, and performing the action by the processing device.

8 Claims, 5 Drawing Sheets

(51) Int. Cl.
*G06F 3/01* (2006.01)
*G06K 9/00* (2006.01)
*G06F 3/02* (2006.01)
*G06F 3/0488* (2013.01)
*G06F 21/32* (2013.01)

(52) U.S. Cl.
CPC .......... *G06F 3/04883* (2013.01); *G06F 21/32* (2013.01); *G06K 9/0002* (2013.01); *G06K 9/00013* (2013.01); *G06K 9/00087* (2013.01); *G06F 2203/0338* (2013.01); *G06F 2203/04808* (2013.01); *G06K 9/00006* (2013.01); *G06K 9/00422* (2013.01)

(56) References Cited

U.S. PATENT DOCUMENTS

| | | |
|---|---|---|
| 2015/0135108 A1 | 5/2015 | Pope et al. |
| 2015/0185954 A1* | 7/2015 | Chang .................. G06F 3/0416 345/173 |
| 2017/0147073 A1 | 5/2017 | Dow et al. |
| 2017/0147193 A1 | 5/2017 | Dow et al. |

OTHER PUBLICATIONS

List of IBM Patents or Patent Applications Treated as Related (Appendix P); Dated Nov. 10, 2017; pp. 1-2.

* cited by examiner

GESTURE RECOGNITION AND CONTROL BASED ON FINGER DIFFERENTIATION

DOMESTIC PRIORITY

This application is a Continuation of U.S. patent application Ser. No. 14/950,630, filed Nov. 24, 2015 and all the benefits accruing therefrom under 35 U.S.C § 119, the contents of which are herein incorporated by reference in their entirety.

BACKGROUND

The present invention relates generally to touchscreen control, and more specifically, to sensing control actions based at least in part on fingerprint pattern identification.

Touchscreens have become increasing popular features of computing devices, particularly of portable or mobile devices, such as tablets and smartphones. Users typically interact with touchscreens by controlling processing operations using various gestures, such as stationary touches and swipes. In recent years, wearable devices such as fitness trackers and smartwatches have become more popular. In order to make such devices wearable, their size, and correspondingly the size of their touchscreens, is typically significantly smaller than that of smartphones or other mobile devices. The size restrictions associated with such devices can prove challenging, particularly due to limitations in gestures that can be performed on relatively small touchscreens.

SUMMARY

An embodiment of a computer implemented method of performing a processing action includes detecting an input from a user via an input device of a processing device, the input including a touch by at least one finger of a plurality of fingers of the user, estimating a gesture performed by the at least one finger based on the touch, measuring at least part of a fingerprint of the at least one finger, and identifying the at least one finger used to apply the input by the user based on stored fingerprint data that differentiates between individual fingers of the user. The method also includes identifying an action to be performed based on the estimated gesture and based on the identified at least one finger, and performing the action.

An embodiment of an apparatus for performing a processing action includes an input device configured to receive an input from a user, the input including a touch by at least one finger of a plurality of fingers of the user, a touch sensor configured to detect the touch by the user, and a finger pattern sensor configured to measure at least part of a fingerprint of the at least one finger. The apparatus also includes a processing device configured to perform estimating a gesture performed by the at least one finger based on the touch, identifying the at least one finger used to apply the input by the user based on stored fingerprint data that differentiates between individual fingers of the user, identifying an action to be performed based on the estimated gesture and based on the identified at least one finger, and performing the action.

An embodiment of a computer program product for performing a processing action includes a computer readable storage medium having program instructions embodied therewith, wherein the computer readable storage medium is not a signal, the program instructions readable by a processing circuit to cause the processing circuit to perform a method. The method includes detecting an input from a user via an input device of a processing device, the input including a touch by at least one finger of a plurality of fingers of the user, estimating a gesture performed by the at least one finger based on the touch, measuring at least part of a fingerprint of the at least one finger, and identifying the at least one finger used to apply the input by the user based on stored fingerprint data that differentiates between individual fingers of the user. The method also includes identifying an action to be performed based on the estimated gesture and based on the identified at least one finger, and performing the action by the processing device.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Apparatuses, systems and methods are provided for detecting user inputs and performing processing and/or display actions. An embodiment of a processing device, such as a smartphone or wearable mobile device, is configured to detect an input from a user, such as a touch by at least one finger of a plurality of fingers of the user. In one embodiment, the processing device includes a touchscreen, on which a gesture such as a stationary touch or swipe can be applied. The processing device includes a touch sensor for detecting the gesture, and a finger pattern sensor for detecting a finger print, a portion of a fingerprint, combinations of features or other patterns discernable for differentiating between different users and different fingers of an individual user.

The processing device is configured to estimate the gesture, measure at least part of a fingerprint of a finger or fingers used by the user to apply the input, and identify the individual finger or fingers used. The combination of the gesture and identification of the fingers used is correlated or associated with a specific action to be performed by the processing device.

The embodiments described herein present greatly enhanced functionality and ability to apply a large number of different inputs to a relatively small input space, such as a touchscreen of a smartwatch. Based on differentiating between each finger of a user, a gesture with one finger (e.g., an index finger) can prompt a specific action, while the same gesture with a different finger (e.g., a middle or ring finger) can be used to prompt a completely different action.

Figure 1:
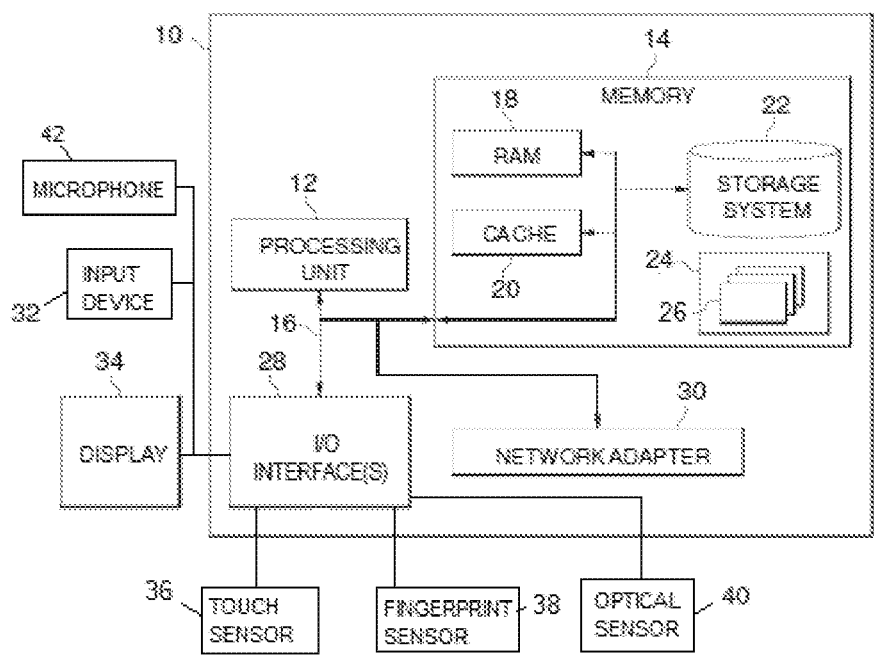
FIG. 1 depicts a processing device in accordance with an embodiment.

FIG. 1 illustrates an example of a computing device 10 that can be used to perform various actions, including receiving and processing user inputs and performing various processing actions as described herein, including storing and processing data, executing programs and displaying information. The device 10 may be configured to receive or gather communications (e.g., data, text, spoken words, emails, authentication information, etc.) from other locations, such as a network (e.g., Internet) and/or another processor (e.g., server, computer or mobile device). The device 10 may be any device capable of receiving user input, performing processing actions and displaying text and other information to a user, such as a mobile device (e.g., a smartphone), a wearable device (e.g., a smartwatch and/or fitness tracker), a tablet computer, a laptop computer, a desktop computer, a mainframe a server and others.

The device 10 includes various components and/or modules for performing various processing, sensing and display functions. The device 10 includes one or more processors or processing units 12, a memory 14, and a bus 16 that couples various components including the memory 14 to the processor 12.

The memory 14 includes computer readable media in the form of volatile memory, such as random access memory (RAM) 18 and/or cache memory 20. The device 10 may also include other removable/non-removable, volatile/non-volatile computer system storage media. For example, the memory 14 includes storage 22 including a non-removable, non-volatile magnetic media (e.g., a hard drive), and/or removable storage media such as a memory card or flash drive. The memory 14 may include at least one program product having a set (e.g., at least one) of program modules that are configured to carry out the functions of embodiments described herein. For example, the memory 14 stores a program or utility suite 24 including one or more program modules 26 to carry out the functions and/or methodologies of embodiments described herein.

The device 10 includes or is connected to various components, which may be incorporated in the device 10 or external to the device 10. The device 10 includes interfaces 28 for communication with components and may also include a network adapter 30 for communication with other devices or components over a suitable network or remote connection. The device 10 is connected to or includes at least one input device 32 such as a keyboard, button, mouse and/or touchscreen, and a display 34. The components shown in FIG. 1 and described herein are provided for illustrative purposes and are not intended to be limiting.

The device 10 also includes a touch sensor 36 that is configured to detect contact and/or pressure from a user, e.g., via one or more fingers, and may also detect contact from other body parts (e.g., ear or wrist) and/or other input devices such as styluses. The touch sensor 36 detects not only finger position, but also movements along a touchscreen. Movements of a finger or finger used an inputs to the device 10 are referred to herein as movements, motions or swipes. In this way, the touch sensor 36 may be used by the device 10, e.g., in conjunction with other input devices and program modules 26, to recognize a gesture performed by a user.

As described herein, a gesture refers to any interaction between a user and a touchscreen or other input device. A gesture may be a touch at some location on the touchscreen by an object (e.g., one or more fingers), a movement or swipe of the touching object or a combination thereof. The movement may include an extent (e.g., distance along a path of the touch), speed and/or path of the movement along the touchscreen. Other aspects of a gesture may include, for example, an amount of pressure, number of touches (e.g., single "click" or double click), and any other criteria that may be used to discern the nature of the gesture and differentiate it relative to other gestures.

Any suitable type of touch sensor 36 may be included in the device. For example, the touch sensor 36 is a capacitive or acoustic wave sensor. The touch sensor 36 may be located under a touchscreen or embedded within the touchscreen (e.g., between screen layers).

The device 10 also includes a biometric finger pattern sensor 38 that is configured to detect characteristics of a user's finger, such as a fingerprint, portion of a fingerprint, or other characteristic that allows, e.g., identification of a user and/or differentiation between individual fingers of a user. Such characteristics, whether utilized individually or in combination, are referred to herein as "finger patterns." A "finger pattern" refers to any detectable feature or features, or any other identifying information detected by the finger pattern sensor that can be used to identify characteristics of individual fingers of a user's hand and/or differentiate between fingers.

Although the finger pattern sensor 38 may be configured solely to detect fingerprints or other finger patterns, it may also detect other characteristics of a user, such as temperature, vein pattern and heartrate. One or more of these additional characteristics may be used in conjunction with fingerprint patterns to identify a user and/or differentiate between a user's fingers. An example of a fingerprint pattern sensor is a capacitive sensor. The finger pattern sensor 38, in one example, is embedded in or below a touchscreen or a portion of a touchscreen.

In addition to finger pattern information, one or more sensors can be included for measuring other biometric information, such as types of finger movement (e.g., swiping, finger pressure, finger rolling), and vital signs (e.g., heart rate and temperature). It is noted that the touch sensor and fingerprint sensor may be configured as individual sensors or sensor assemblies, or integrated into a common sensor assembly that is used by various processing modules to detect gestures and analyze fingerprint patterns.

Various other components may be incorporated in the device 10. For example, an optical sensor 40 (e.g., camera, infrared sensor, etc.) can be used for recording biometric characteristics such as facial features and eye movements. A microphone 42 or other sound recording device may be included for recording voice commands and recording changes in voice or other audible indicators.

The device 10 is configured to perform various actions in response to user gestures, based on both an estimation of the nature of the gesture (e.g., position, extent, path, speed etc.) and an identification of at least a portion of a finger pattern of a user. In one embodiment, the device 10 is configured to, in response to detecting a gesture by a user (e.g., by detecting contact between a user's finger or fingers), identify the finger or fingers used via the finger pattern sensor 38, and associate an action to be performed based on the gesture and the specific finger or fingers used to perform the gesture. This ability to differentiate between fingers and associate actions with gestures combined with identification of the finger(s) used, greatly increases the number of possible input combinations that can be identified. This ability is also useful for devices such as smartwatches that have limited screen area by significantly increasing the number of input combinations that would otherwise be possible or feasible.

Figure 2:
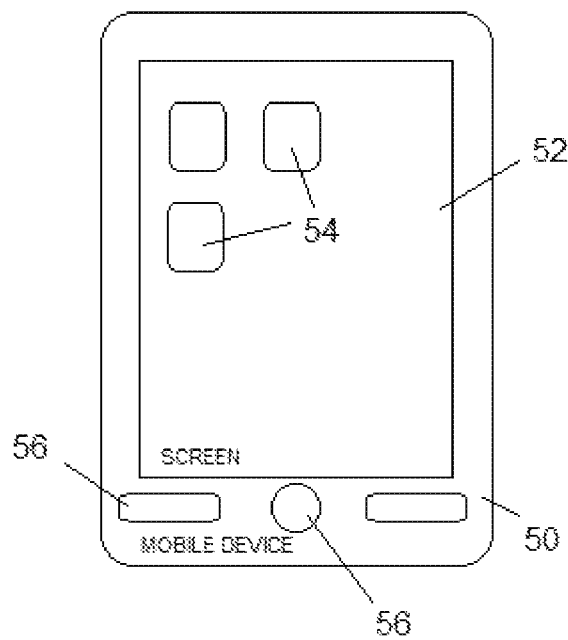
FIG. 2 depicts an embodiment of a mobile device in accordance with an embodiment
Figure 3:
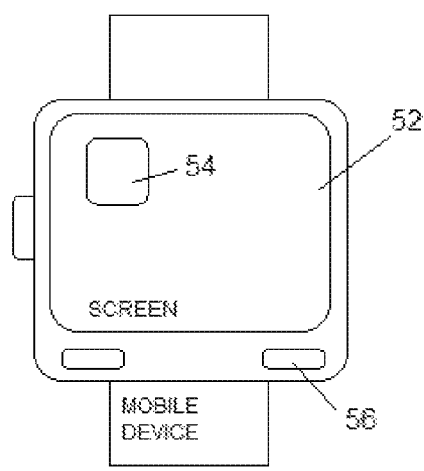
FIG. 3 depicts an embodiment of a wearable mobile device in accordance with an embodiment.

FIGS. 2 and 3 show examples of the device 10 configured as a mobile device 50 that can incorporate the embodiments described herein. In the example of FIG. 2, the mobile device 50 is portable device such as a smartphone or tablet. In the example of FIG. 3, the mobile device 50 is a wearable mobile device such as a smartwatch. In both examples, the mobile device 50 includes at least one touchscreen 52. Each touchscreen 52 defines at least one display area for display of program execution outputs programs as executed by the device operating system and programs. In these examples, the touchscreen 52 is shown as displaying a number of icons 54 (e.g., application icons) or other visual indicators that can be opened, moved and otherwise manipulated or interacted with using a user's finger or fingers. Any number of additional components can be incorporated with the mobile device 50, such as one or more buttons 56, one or more cameras, an optical sensor, biometric sensors and/or additional screens.

All or a portion of the display area is configured both as a touchscreen and a finger pattern sensor. For example, capacitive detection circuitry is embedded under or within the screen to allow for detection of both touch and gestures, as well as detection of finger patterns (e.g., fingerprints, portions of fingerprints and/or feature combinations associated with fingerprints). Detection of finger patterns provides functionality to identify a user for authentication or security purposes, and to differentiate between different fingers of a user's hand. Furthermore, the finger pattern sensor may be configured to allow for detection of different portions of an individual finger, so that gestures such as finger rolling can be identified and/or different portions of an individual finger can be associated with different respective actions (e.g., using the side of a finger can denote a different action than using the finger in a normal manner). A finger pattern sensor can also be incorporated into other input devices, such as in one or more buttons 56. In this way, buttons can be given additional functionality by inputting different commands based on which finger is being used to press a button.

Although, the display area(s) described in these embodiments are defined by a touchscreen, they are not so limited. The display area may be any type of display, such as a computer screen, touchscreen, virtual reality display, holographic display or heads up display. Input can be detected (including finger pattern and gesture information), using any suitable input device. For example, a touch pad, optical scanning device, digitizer or other suitable input device may be included.

Figure 4:
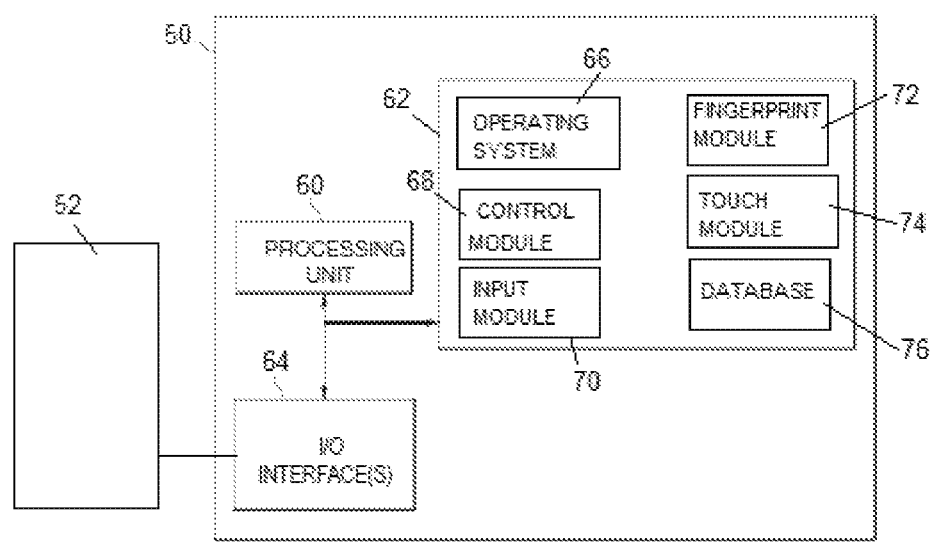
FIG. 4 depicts examples of processing modules configured to perform aspects of embodiments of a method of detecting and processing inputs to a processing device.

FIG. 4 illustrates an embodiment of a program suite that includes various processing modules configured to perform aspects of the methods described herein. The program suite in this embodiment is embodied in the device 10 and or the mobile device 50, but can be embodied in any suitable processing device or system.

The mobile device 50 includes a processor or processing unit 60 connected to a memory 62 and the touchscreen 52 via an appropriate interface 64. One or more processing modules are stored in the memory, including an operating system 66 and stored programs and applications.

A control module 68 is configured to determine an appropriate command or action to be performed in response to a particular combination of a gesture and a finger pattern. An input module 70 receives signals from a touch sensor at or in the touchscreen, and also receives signals from a finger pattern sensor. The signals are input to a fingerprint module 72 and a touch module 74 that process signals from the finger pattern sensor and the touch sensor, respectively, to identify a gesture from the touch sensor signal and identify a finger and/or finger pattern from the finger pattern signal.

The control module 68 receives the gesture and the finger pattern, and associates the combination of the gesture and the finger pattern with an associated command or action to be performed. In one embodiment, the control module 68 communicates with one or more databases 76 or other storage locations, which may be internal to the mobile device or external, e.g., at another location connected to the mobile device by a data network. The one or more databases 76 stores data (such as in a table or other suitable data structure) that associates different combinations of gestures and finger patterns with respective commands or actions. The command or actions associated with a given combination can be pre-selected by the mobile device 50, or selected by a user during a setup or calibration operation.

Figure 5:
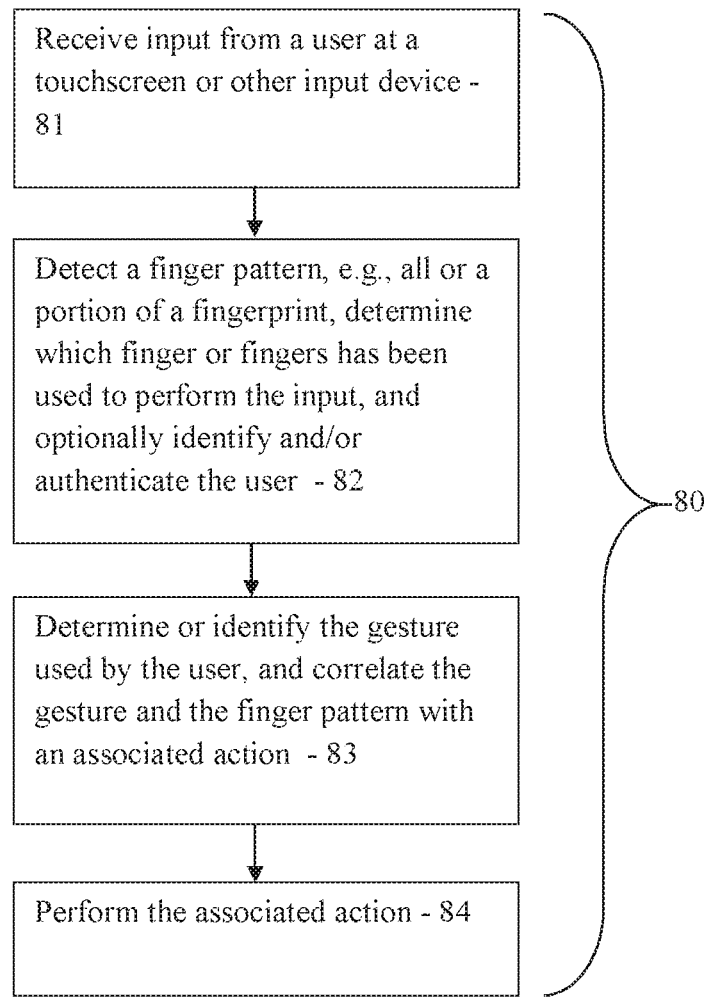
FIG. 5 is a flow diagram depicting an embodiment of a method of detecting and processing inputs to a processing device

FIG. 5 illustrates an embodiment of a method 80 of detecting and processing inputs to a processing device. Although the method 80 is described in conjunction with the mobile device 50 (e.g., mobile device and/or wearable device), the method 80 can be utilized in conjunction with any of the processing devices and systems described herein, such as the device 10, as well as with any device or system that includes display capability. The method 80 includes a plurality of stages represented by blocks 81-84, all of which can be performed sequentially. However, in some embodiments, one or more of the stages can be performed in a different order than that shown or fewer than the stages shown may be performed.

At block 81, a user inputs a command to a processing device via an input device (e.g., a touchscreen) using one or more fingers. In order to provide a selected command (e.g., opening or closing a program or application, pausing an application, etc.), the user employs a specific gesture using one or more fingers. The gesture may be a stationary touch or a sweeping movement on a touchscreen.

For example, the user touches the smartwatch touchscreen 52 with one of his fingers. Depending on which finger and/or the number of fingers used to touch the smartwatch, the control module 68 determines which specific action is to be performed as described further below. In this example, the user touches the touchscreen with an index finger to open a selected application. Touching the touchscreen with a different finger and/or different number of fingers would prompt a different action, e.g., opening a different application.

At block 82, the processing device detects a finger pattern of the finger(s) applied to the touchscreen, such as a fingerprint or features (e.g., markers) associated with a fingerprint. The finger pattern is used to optionally identify the user. In some instances, the user has already been identified, e.g., based on previous inputs, and as such an explicit identification is not necessary.

An example of a finger pattern is a fingerprint or portion thereof. The fingerprint may be a full image of a fingerprint, or may be a set of constituent features that enable finger differentiation. Such features include, for example, locations where ridges and lines end, or where a ridge splits in two. A finger may be identified by matching some group of features with stored features associated with the user and finger.

The finger pattern is used to determine which finger or fingers was/were applied, and optionally identifies and authenticates the user. For example, the fingerprint module 72 receives a signal from a finger pattern sensor, estimates the finger pattern, and correlates the finger pattern with a user or provides the finger pattern to the control module 68 or other suitable processing unit. If the user is authorized to use the device and/or input the command, the method continues.

Based on the finger pattern, the device determines how many fingers have been used, and also identifies which finger by accessing stored data that associates individual finger patterns with individual fingers. For example, the device determines that one finger was used, and identifies that the finger was the thumb, index finger, middle finger, ring finger or pinky (little or fourth) finger. If multiple fingers were detected, the device may simply determine the number of fingers, or determine both the number of fingers and an identification of the individual fingers. In addition to differentiating between fingers on one hand, the device can also differentiate between different hands. For example, the index finger on the right hand is differentiated from the index finger of the left hand. In this way, touching the screen with a user's left hand finger can trigger a different action than touching the screen with the user' right hand.

At block 83, the device (e.g., via the touch module 74) determines the input gesture. A processing unit such as the control module 68 correlates the combination of the gesture and the finger pattern with an action to be performed by the device.

In the example of the user touching the smartwatch touchscreen 52 with an index finger, the control module receives the estimated gesture (a stationary touch) and an identification that the index finger to open a selected application. The control module 68 accesses a data structure and/or storage location that associates different combinations of gestures and finger patterns with respective actions. In this example, the control module 68 determines that a specific application corresponding to a stationary touch with the index finger should be opened.

At block 84, the device performs the action. An example of an action is the opening, execution, pausing and/or closing of a program or application. In the above example, the control module 68 performs an action that includes opening the specific application in response to the touch by the user's index finger.

Figure 6:
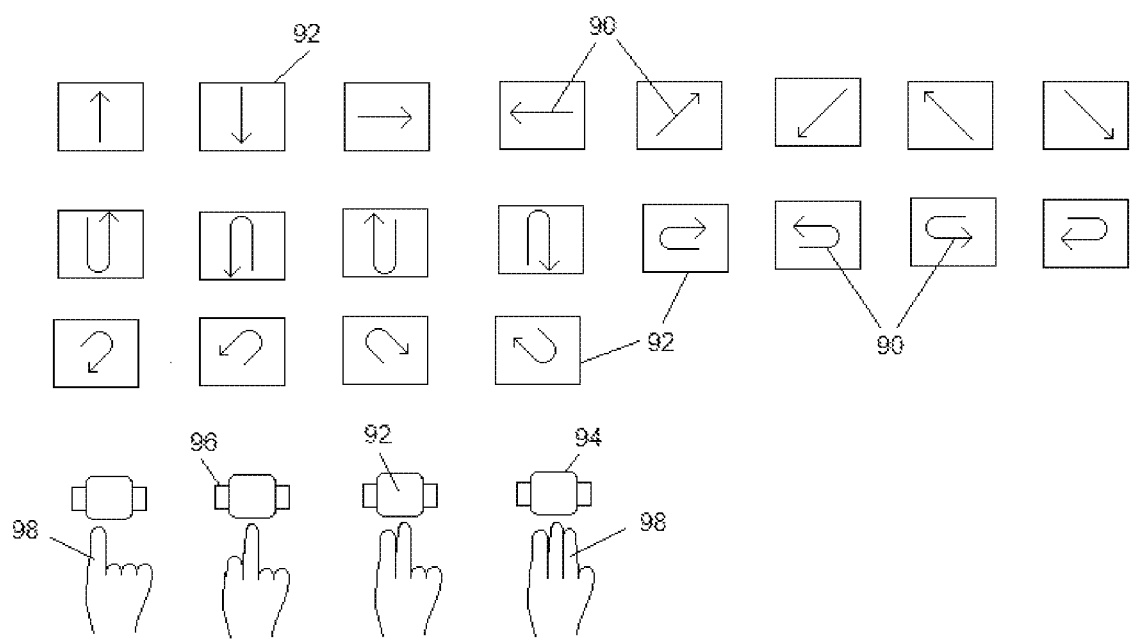
FIG. 6 depicts examples of gestures and finger combinations that can be used as inputs to a processing device according to embodiments described herein.

FIG. 6 illustrates examples of gestures and combinations of gestures and finger patterns that can be used in embodiments described herein. Any number of gestures 90 can be performed by a user by touching or otherwise interacting with a display area 92. In these examples, the display area 92 is shown as at least part of a touchscreen 94 of a smartwatch 96. Examples of gestures 90 include stationary touches, and swipes or movements that follow different paths. In conjunction with identifying the gesture 90 used as an input, the smartwatch 96 (i.e., a processor, processing unit or module in the device) determines a number of fingers 98 and/or identifies the individual finger or fingers used in the input. For example, a particular gesture such as a diagonal wipe (or a simple touch) is associated with a different action depending on the number of fingers used. In another example, a user can use a number of fingers or a hand (e.g., the palm) to completely occlude the touchscreen, for example, to close an application, turn off the smartwatch or put the smartwatch into sleep mode.

In another example, the individual finger or fingers are identified along with the gesture to determine an associated action. For example, a particular type of swipe (e.g., vertical, horizontal or u-shape) is detected, and the device determines that the finger used was the index finger. This combination is associated with an action of opening one of a number of applications stored in the smartwatch 96. The same swipe using a different finger (e.g., the middle finger) would prompt a different action, e.g., would open a different application.

Technical effects and benefits include the ability to support a large number of individually identifiable inputs by a user. Use of finger identification or differentiation greatly increases the number of distinct inputs and commands that may be applied to a given input device. Furthermore, embodiments described herein offer advantages in the context of wearable devices such as smartwatches, which typically include a relatively small touchscreen and thus a limited space on which gestures can be performed.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A wearable mobile device for performing a processing action, the wearable mobile device comprising:
    an input device configured to receive an input from a user, the input including a touch by at least one finger of a plurality of fingers of the user;
    a touch sensor configured to detect the touch by the user;
    a finger pattern sensor configured to measure at least part of a fingerprint of the at least one finger; and
    a processing device configured to perform:
        estimating a gesture performed by the at least one finger based on the touch;
        identifying the at least one finger used to apply the input by the user based on stored fingerprint data that differentiates between individual fingers of the user;
        identifying a plurality of commands based on the estimated gesture, and identifying one of the plurality of commands based on which of the individual fingers is identified based on stored fingerprint data; and performing an action associated with the identified command.

2. The wearable mobile device of claim 1, wherein the gesture is selected from at least one of a stationary touch and a swipe motion following an identifiable approximate path on a touchscreen.

3. The wearable mobile device of claim 1, wherein the input device is a button, and the gesture is a pressing of the button.

4. The wearable mobile device of claim 1, wherein a first command is associated with the estimated gesture and a first number of fingers used by the user, and a second command is associated with the estimated gesture and a second number of fingers used by the user, the second number different from the first number.

5. The wearable mobile device of claim 1, wherein the estimated gesture is a rolling gesture performed using at least one individual finger, the rolling gesture estimated based on a change in the at least part of the fingerprint.

6. The wearable mobile device of claim 1, wherein measuring includes identifying a number of fingers used by the user to apply the input.

7. The wearable mobile device of claim 1, wherein the estimated gesture includes an extent, a speed and path of movement by the at least one finger.

8. The wearable mobile device of claim 1, wherein the estimated gesture includes one or more of an amount of pressure and a number of touches by the at least one finger.

* * * * *